United States Patent
Kamei

(10) Patent No.: US 7,301,523 B2
(45) Date of Patent: Nov. 27, 2007

(54) LIQUID CRYSTAL DISPLAY DEVICE

(75) Inventor: Tatsuo Kamei, Chiba (JP)

(73) Assignee: Hitachi Displays, Ltd., Chiba-ken (JP)

( * ) Notice: Subject to any disclaimer, the term of this patent is extended or adjusted under 35 U.S.C. 154(b) by 604 days.

(21) Appl. No.: 10/856,934

(22) Filed: Jun. 1, 2004

(65) Prior Publication Data

US 2004/0246435 A1 Dec. 9, 2004

(30) Foreign Application Priority Data

Jun. 4, 2003 (JP) ............................. 2003-159277

(51) Int. Cl.
*G09G 5/00* (2006.01)
*G09G 3/36* (2006.01)

(52) U.S. Cl. .................. 345/102; 345/207; 349/58; 349/61; 362/29; 362/30; 362/545

(58) Field of Classification Search ................ 345/102, 345/207, 690; 349/58, 61, 62; 362/29, 30, 362/543–545, 611, 612; 359/62, 83, 86; 714/742
See application file for complete search history.

(56) References Cited

U.S. PATENT DOCUMENTS

| 5,818,553 | A  | * | 10/1998 | Koenck et al. | ................ 349/61  |
| 5,850,205 | A  | * | 12/1998 | Blouin        | ................ 345/102 |
| 6,243,069 | B1 | * | 6/2001  | Ogawa et al.  | ................ 345/102 |
| 6,909,419 | B2 | * | 6/2005  | Zavracky et al. | .......... 345/102 |
| 6,995,753 | B2 | * | 2/2006  | Yamazaki et al. | .......... 345/204 |
| 7,053,881 | B2 | * | 5/2006  | Itoh          | ................ 345/102 |

FOREIGN PATENT DOCUMENTS

| JP | 7-301784   | 5/1994 |
| JP | 2001-66569 | 8/1999 |
| JP | 2001-209049 | 1/2000 |

* cited by examiner

*Primary Examiner*—Henry N Tran
(74) *Attorney, Agent, or Firm*—Reed Smith LLP; Stanley P. Fisher, Esq.; Juan Carlos A. Marquez, Esq.

(57) ABSTRACT

In a liquid crystal display device including a liquid crystal display panel and a backlight, the present invention provides a detection-use pixel having the same constitution as respective pixels constituting a liquid crystal display part in the liquid crystal display panel and being formed on a region other than the liquid crystal display part, a light detector detecting light from the backlight through the detection-use pixel, and a controller adjusting the intensity of the light from the backlight in response to a signal from the light detector to adjust the change of the characteristics and chromaticity in the liquid crystal display panel properly.

10 Claims, 2 Drawing Sheets

LIQUID CRYSTAL DISPLAY DEVICE

The present application claims priority from Japanese application JP2003-159277 filed on Jun. 4, 2003, the content of which is hereby incorporated by reference into this application.

BACKGROUND OF THE INVENTION

1. Field of the Invention

The present invention relates to a liquid crystal display device, and more particularly to a liquid crystal display device which includes a backlight on a back surface of a liquid crystal display panel.

2. Description of the Related Art

The liquid crystal display device is configured such that respective pixels of the liquid crystal display panel control optical transmissivities thereof and hence, the liquid crystal display device is usually provided with the backlight on the back surface of the liquid crystal display panel.

Here, the liquid crystal display panel is configured such that each pixel includes a pair of electrodes and the optical transmissivity of liquid crystal is controlled for each pixel in response to an electric field generated between these electrodes.

With respect to the liquid crystal display panel having such a constitution, there has been known a liquid crystal display panel in which liquid crystal thereof includes the temperature characteristics and which includes means for adjusting a change of contrast in response to the temperature characteristics (see Patent Document 1).

There has been also known a liquid crystal display panel in which to prevent the occurrence of luminance irregularities on a surface of a backlight along with the large-sizing of the liquid crystal display panel, a plurality of light emitting diodes are used as the backlight and the liquid crystal display panel includes means which increases the luminance of the light emitting diodes at dark portions (see Patent Document 2).

Further, there has been also known a liquid crystal display panel which includes a plurality of so-called white light emitting diodes as a backlight and also includes means which compensates for irregularities of chromaticity of the backlight (see Patent Document 3).

Patent gazettes the inventors of the present patent application referred is identified as follows.

[Patent Document 1]
Japanese Unexamined Patent Publication: JP-A-7-301784

[Patent Document 2]
Japanese Unexamined Patent Publication: JP-A-2001-66569

[Patent Document 3]
Japanese Unexamined Patent Publication: JP-A-2001-209049

SUMMARY OF THE INVENTION

However, the liquid crystal display devices having such constitutions respectively must have means to solve the above-mentioned respective drawbacks.

That is, there may be a case in which the characteristics and the chromaticity of the liquid crystal display panel are deviated from the characteristics and the chromaticity which are requested as final products attributed to a cause that the color filter characteristics or the liquid crystal characteristics of the liquid crystal display panel are changed or a cause that the chromaticity is changed attributed to irregularities of backlights or conditions such as temperature and the like at the time of lighting the backlight. In such a case, it is necessary to provide means which can overcome the drawbacks attributed to these causes and hence, the structure becomes complicated unavoidably.

The present invention has been made under such circumstances and it is an object of the present invention to provide a liquid crystal display device which can properly adjust the above-mentioned changes of characteristics irrespective of the simple constitution thereof.

To briefly explain the summary of representative inventions among the inventions disclosed in this specification, they are as follows.

Means 1.

The liquid crystal display device according to the present invention is, for example, a liquid crystal display device including a liquid crystal display panel and a back light, wherein a test pixel for detection which has the same constitution as respective pixels constituting a liquid crystal display part of the liquid crystal display panel is formed on a region other than the liquid crystal display part, and the liquid crystal display device further includes a light detector which detects light from the backlight through the test pixel for detection and a controller which adjusts the intensity of the light from the backlight in response to a signal from the light detector.

Means 2.

The liquid crystal display device according to the present invention is, for example, a liquid crystal display device including a liquid crystal display panel for color display and a back light, the back light including a red light source, a green light source and a blue light source, wherein a test red pixel for detection, a test green pixel for detection and a test blue pixel for detection which have the same constitution as respective pixels constituting a liquid crystal display part of the liquid crystal display panel are formed on a region other than the liquid crystal display part, and the liquid crystal display device further includes a red light detector, a green light detector and a blue light detector which detect light from the backlight through the test red pixel for detection, the test green pixel for detection, the blue test pixel for detection and a controller which adjusts the intensities of the red light source, the green light source and the blue light source of the backlight in response to signals from the light detectors.

Means 3.

The liquid crystal display device according to the present invention is, for example, on the premise of either one of the means 1 and 2, characterized in that a frame having a display window which exposes a liquid crystal display part of the liquid crystal display panel is arranged on an observation-side surface of the liquid crystal display panel, and the test pixel for detection is covered with the frame.

Means 4.

The liquid crystal display device according to the present invention is, for example, on the premise of either one of the means 1, 2 and 3, characterized in that the light detector is arranged on the observation-side surface of the liquid crystal display panel.

Means 5.

The liquid crystal display device according to the present invention is, for example, on the premise of any one of the means 1 to 3, characterized in that the light detector is arranged on a surface of the liquid crystal display panel opposite to the observation-side surface and, at the same time, a mirror is arranged on the observation-side surface of the liquid crystal display panel in a state that the mirror and the light detector sandwich the test pixel for detection.

Means 6.

The liquid crystal display device according to the present invention is, for example, on the premise of any one of the means 1, 2, 3, 4 and 5, characterized in that the test pixels for detection are formed by making use of dummy pixels which are formed on peripheries of the respective pixels which constitute the liquid crystal display part.

Here, the present invention is not limited to the above-mentioned constitutions and various modifications can be made without departing from the technical concept of the present invention.

DETAILED DESCRIPTION

Embodiments of the liquid crystal display device according to the present invention are explained in detail in conjunction with drawings hereinafter.

Embodiment 1

Figure 1:
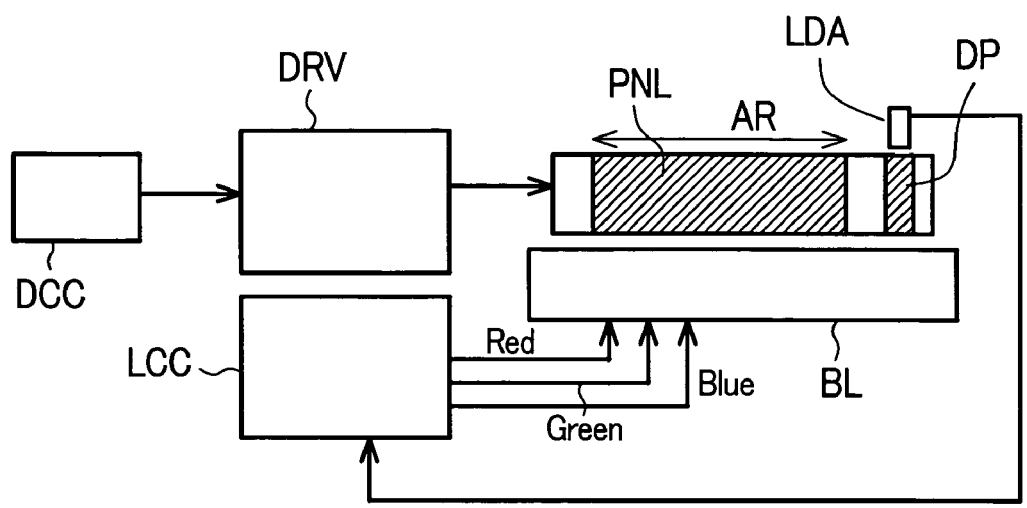
FIG. 1 is a schematic constitutional view showing one embodiment of a liquid crystal display device according to the present invention.

FIG. 1 is a constitutional view showing one embodiment of the liquid crystal display device according to the present invention.

First of all, there is provided a liquid crystal display panel PNL. The liquid crystal display panel PNL is configured such that respective substrates are arranged to face each other with liquid crystal therebetween to form an envelope and the liquid crystal display panel PNL includes a large number of pixels which are arranged in a matrix array in a spreading direction of the liquid crystal. A pair of electrodes is formed in each pixel and the liquid crystal is behaved in response to an electric field generated between respective electrodes so as to control the optical transmissivity of the liquid crystal.

Here, the electrodes are pulled out to the outside of the envelope through respective signal lines and signals are supplied to these signal lines from a liquid crystal driving driver DRV. That is, in response to the signals from the liquid crystal driving driver DRV through the signal lines, a given voltage is applied to the pair of electrodes of respective pixels thus performing a control of optical transmissivities of respective pixels independently from each other.

Further, the liquid crystal display device is configured such that a backlight BL is arranged on a back surface of the liquid crystal display panel PNL as viewed from the observation side of the liquid crystal display panel PNL and light from the backlight BL reaches eyes of a viewer through the respective pixels of the liquid crystal display panel PNL whose optical transmissivities are respectively controlled.

Here, the backlight BL is constituted such that, for example, red diodes, green diodes and blue diodes are respectively arranged in a mixed form on a plane parallel to the liquid crystal display panel PNL, wherein light which is a mixture of the these colors, that is, white light is irradiated to the liquid crystal display panel PNL side.

Further, the light intensities of the red diode, the green diode and the blue diode of the back light BL are configured to be independently controlled by a backlight control circuit LCC. As described above, the backlight BL is configured to produce the white light by emission of lights from respective diodes and to allow the white light to pass through the respective pixels of the liquid crystal display panel PNL. However, to correct the change of chromaticity of the liquid crystal display panel PNL, the light emitting intensities of the respective diodes are configured to be adjusted by the backlight control circuit LCC.

On the other hand, the liquid crystal display panel PNL is constituted as a liquid crystal display panel for color display, wherein with respect to the respective pixels, for every three pixels which are arranged close to each other, one pixel is allocated to red, another pixel is allocated to green and the remaining pixel is allocated to blue. To be more specific, the color filters which are allocated to respective pixels are configured to be formed on a liquid-crystal-side surface of one of the substrates facing each other.

Further, a mass of these pixels constitute a liquid crystal display part AR which displays an image thereon and a pixel for detection (referred to as a test pixel for detection DP) which does not function as the liquid crystal display part AR is formed in a portion of a periphery of the liquid crystal display part AR. The test pixel for detection DP is, for example, constituted of three test pixels for detection DP, wherein one test pixel for detection DP is allocated to red, another test pixel for detection DP is allocated to green, and the remaining test pixel for detection DP is allocated to blue. To be more specific, the color filters which are allocated to respective pixels are configured to be formed on liquid-crystal-side surfaces of the respective substrates.

In view of the above-mentioned constitution, the pixels and the test pixels for detection DP in the inside of the liquid crystal display part AR are formed in parallel at the time of manufacturing the liquid crystal display panel PNL and these pixels have the same characteristics, that is, the same color filter characteristics, the same liquid crystal characteristics and same other characteristics. In other words, when the color filter characteristics of the pixels in the inside of the liquid crystal display part AR are changed, this change is made in the substantially same mode as the change of the color filter characteristics of the test pixels for detection.

In the liquid crystal display panel PNL, in response to a signal from the liquid crystal driving driver DRV, an image is displayed on the liquid crystal display part AR in response to the signal. Here, the above-mentioned three test pixels for detection DP are configured to always have the maximum optical transmissivity.

Further, over the observation-side surface of the liquid crystal display panel PNL, light detectors LDA are formed such that light detectors LDA respectively face the above-mentioned three test pixels for detection DP and outputs of the respective light detectors LDA are inputted to the backlight control circuit LCC.

That is, in the liquid crystal display panel PNL, the states of light transmission of the above-mentioned respective test pixels for detection DP which are formed under the same conditions as the respective pixels of the liquid crystal display part AR are detected by the light detectors LDA. For example, when the detected chromaticity of the test pixel for detection DP is displaced from the desired chromaticity, the light emitting intensity of the diodes of color of the backlight BL corresponding to the test pixel for detection DP is adjusted so as to make the diodes hold the desired chromaticity. With respect to the backlight which generates the white light using the plurality of diodes which differ in light emission colors, the chromaticities of the light emission colors determine the purity of white (quality).

To be more specific, when it is detected that the red color is shifted from a given value based on the signal supplied from the light detector LDA which is arranged to face the test pixel for detection DP which is allocated to the red color, the light emitting intensity of the red diodes of the backlight BL is adjusted so as to make the red diodes hold the desired chromaticity. Further, when it is detected that the green color is shifted from a given value based on the signal supplied from the light detector LDA which is arranged to face the test pixel for detection DP which is allocated to the green color, the light emitting intensity of the green diodes of the backlight BL is adjusted so as to make the green diodes hold the desired chromaticity. Still further, when it is detected that the blue color is shifted from a given value based on the signal supplied from the light detector LDA which is arranged to face the test pixel for detection DP which is allocated to the blue color, the light emitting intensity of the blue diodes of the backlight BL is adjusted so as to make the blue diodes hold the desired chromaticity.

Here, in FIG. 1, to the liquid crystal driving driver DRV, signals are supplied from the display control circuit DCC, for example.

In the liquid crystal display device having such a constitution, when the color filter characteristics or the liquid crystal characteristics of the liquid crystal display panel PNL are changed or the chromaticity is changed due the irregularities of the backlight or conditions such as temperature at the time of lighting, it is possible to obviate these changes and hence, it is possible to always hold the chromaticity in a stable manner.

In other words, when the optical transmissivity of any one of test pixels for detection DP is lowered due to, for example, the change of color filter characteristics or liquid crystal characteristics, the irregularities of the backlight BL or the change of the backlight BL such as change of temperature at the time of lighting, the light intensity of the light emitting diodes of the color corresponding to the test pixel for detection DP is increased so as to compensate for an amount of intensity of light corresponding to the lowering of contrast. To the contrary, when the optical transmissivity of the test pixel for detection DP is higher than a proper value, to restore the proper contrast, the light intensity of the light emitting diodes of the color corresponding to the test pixel for detection DP is lowered. Accordingly, the liquid crystal display device can always hold the display contrast which is not influenced by the change of optical transmissivities of the pixels.

In the above-mentioned embodiment, the test pixels for detection DP are formed on the region other than the liquid crystal display part AR exclusively or in a dedicated manner. However, with respect to the liquid crystal display panel PNL, there exists a liquid crystal display panel PNL which includes so-called dummy pixels which are different from the pixels arranged in the inside of the liquid crystal display part AR. It is needless to say that some of these dummy pixels are made to function as the above-mentioned test pixels for detection DP.

That is, in the liquid crystal display part AR, regions which are surrounded by gate signal lines which extend in the x direction and are arranged in the y direction and drain signal lines which extend in the y direction and are arranged in the x direction constitute pixel regions, wherein each pixel region includes a switching element which is turned on in response to a scanning signal from a one-side gate signal line, a pixel electrode to which a video signal is supplied from a one-side drain signal line through the switching element, and a capacitive element which is formed between the pixel electrode and another neighboring gate signal line different from the gate signal line for driving the switching element for storing the video signal.

In this case, to make the above-mentioned capacitive elements in respective pixels in a pixel row arranged at an uppermost stage or a lowermost stage of the liquid crystal display part AR sufficiently exhibit functions thereof, at a stage above the uppermost stage and at a stage below the lowermost stage of the liquid crystal display part AR, pixel rows having the substantially same constitution are formed and these pixel rows are constituted to be shielded from light by a black matrix or the like.

The respective pixels of the pixel rows which are shielded from light by the black matrix or the like are referred to as dummy pixels and some of these dummy pixels are made to function as the above-mentioned test pixels for detection DP.

Embodiment 2

Figure 2:
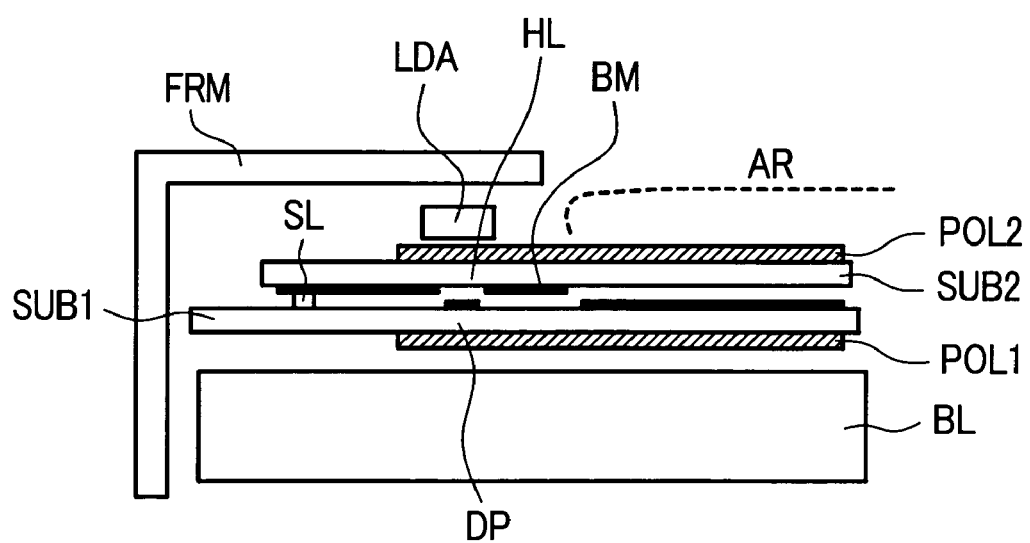
FIG. 2 is a schematic constitutional view showing another embodiment of a liquid crystal display device according to the present invention.

FIG. 2 shows an embodiment describing the detailed constitution when light detectors LDA are arranged on an observation-side surface of a liquid crystal display panel PNL as exemplified in conjunction with the embodiment 1.

As described above, the test pixels for detection DP are formed in the region other than the liquid crystal display part AR separately from the pixels which are formed in the liquid crystal display part AR. Accordingly, usually, in the liquid crystal display part AR, the black matrix BM is formed on the liquid-crystal-side surface of a transparent substrate SUB2, for example, to define respective pixels, and a material layer of the black matrix BM directly extends over regions other than the liquid crystal display part AR. The reason that the material layer of the black matrix BM extends over the regions other than the liquid crystal display part AR is to prevent leaking of light from the backlight BL.

Further, in the extension portion of the black matrix BM, holes HL are formed at portions corresponding to portions where the test pixels for detection DP are formed. These holes HL are formed for preventing blocking of paths along which light from the backlight BL reaches the light detectors LDA through the test pixel for detection DP by a material layer of the black matrix BM.

Further, with respect to the transparent substrates SUB1, SUB2 which constitutes an envelope of the liquid crystal display panel PNL, on respective surfaces of these substrates SUB1, SUB2 which are arranged opposite to liquid crystal sides thereof, polarizers POL1, POL2 are formed. The polarizers POL1, POL2 are formed such that they extend over the region where the test pixels for detection DP are formed. The polarizers POL1, POL2 are required for visualizing the behavior of the electric field of the liquid crystal and they extend over the region where the test pixels for detection DP are formed so as to impart the same optical conditions to the respective pixels in the liquid crystal display part AR and the test pixels for detection DP.

Further, to form the liquid crystal display panel PNL and the backlight BL into a module, a frame FRM in which a hole (a display window) which exposes the liquid crystal display part AR of the liquid crystal display panel PNL is formed is arranged on the observation-side surface of the liquid crystal display panel PNL. Here, the frame FRM is formed such that the frame FRM also covers a portion where the above-mentioned test pixels for detection DP are formed, that is, a portion where the light detectors LDA are arranged. This is because that it is not necessary for a viewer to observe the light detectors LDA with his naked eyes.

Here, a sealing material SL is formed between the transparent substrates SUB1, SUB2 such that the sealing material SL sufficiently surrounds the liquid crystal display part AR. The sealing material SL has a function of fixing the transparent substrate SUB2 to the transparent substrate SUB1 and a function of sealing the liquid crystal interposed between the transparent substrates SUB1, SUB2 hermetically.

Embodiment 3

Figure 3:
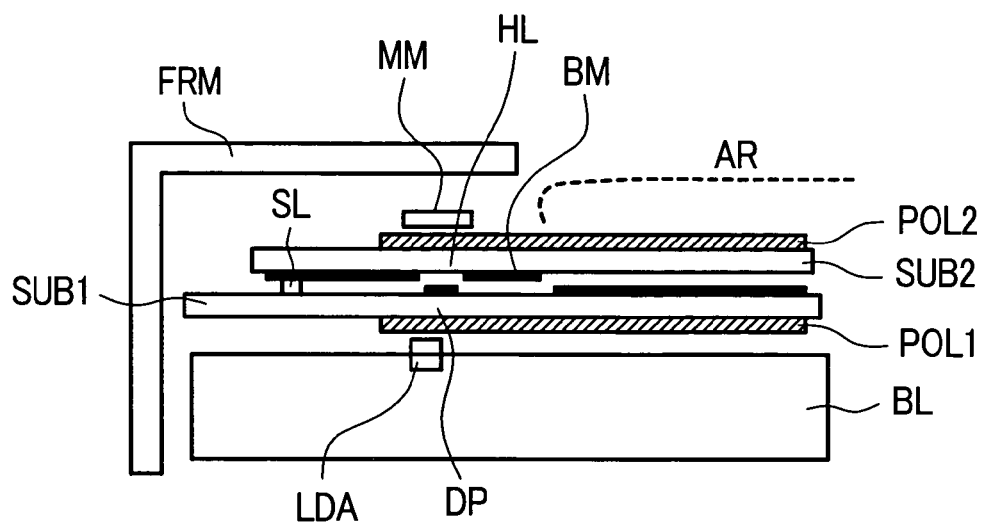
FIG. 3 is a schematic constitutional view showing another embodiment of a liquid crystal display device according to the present invention.

FIG. 3 is a constitutional view showing another embodiment of the liquid crystal display device according to the present invention and corresponds to FIG. 2.

The constitution which makes this embodiment different from the embodiment shown in FIG. 2 lies in that the light detectors LDA which are arranged at the portions of the test pixels for detection are arranged on a surface of the liquid crystal display panel PNL opposite to the observation-side surface. Further, for example, sheet-like mirror members MM are arranged at the portions of the test pixels for detection DP and on the observation-side surface of the liquid crystal display panel PNL.

Due to such a constitution, the light detectors LDA can detect lights which are irradiated from the backlight BL and are reflected on the mirror members MM, wherein since the detected lights are lights which pass through the test pixels for detection DP, the optical-system state of the test pixels for detection DP can be detected.

Accordingly, it is not always necessary to position the light detectors LDA in the direction perpendicular to the transparent substrate SUB1 with respect to the test pixels for detection DP. It is needless to say that provided that an optical path along which the light from the backlight BL connects the test pixel for detection DP, the mirror member MM, the test pixel for detection DP and the light detector LDA can be formed, the light detector LDA can be arranged in the optical path.

Here, in this embodiment, in the same manner as the embodiment shown in FIG. 2, the holes HL are formed in the black matrix BM, the respective polarizers POL1, POL2 extend over the region where the test pixels for detection DP are formed, and the frame FRM is formed to cover the light detectors LDA.

Embodiment 4

Figure 4:
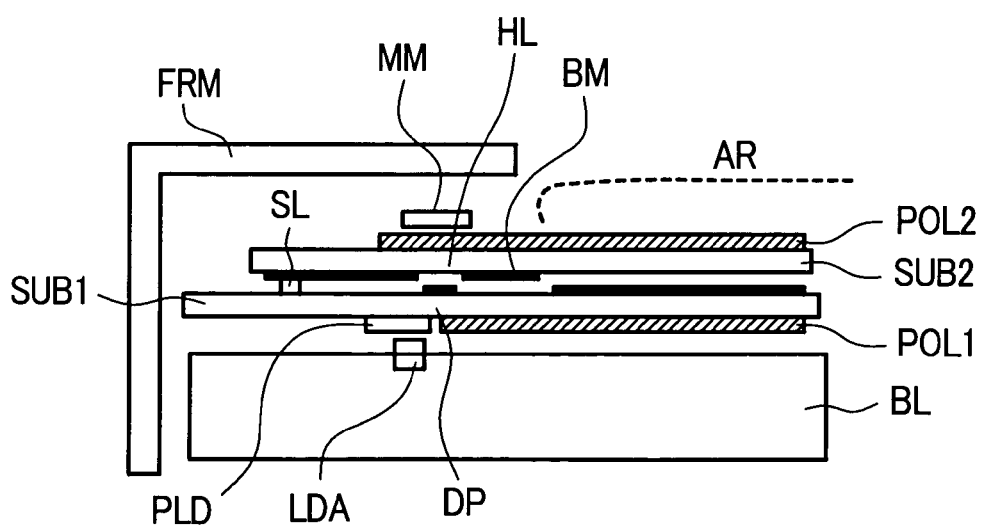
FIG. 4 is a schematic constitutional view showing another embodiment of a liquid crystal display device according to the present invention.

FIG. 4 is a constitutional view showing another embodiment of the liquid crystal display device according to the present invention and corresponds to FIG. 3.

The constitution which makes this embodiment different from the embodiment shown in FIG. 3 lies in that in an optical path along which the lights irradiated from the backlight BM are reflected on the mirror member MM and reach the light detectors LDA after passing through the test pixels for detection DP, the lights are arranged to pass through polarization elements PLD which are formed on a backlight-BL-side surface of the transparent substrate SUB1. Due to such a constitution, the polarization elements PLD are formed separately from the polarizer POLL which is formed on the backlight-BL-side surface of the transparent substrate SUB1.

The polarization elements PLD perform a function substantially equal to the function of the polarizer POL1 formed on a backlight-BL-side surface of the transparent substrate SUB1.

In the above-mentioned embodiments, the explanation has been made with respect to the color liquid crystal display device. However, it is needless to say that the liquid crystal display device to which the present invention is applicable is not always the color liquid crystal display device. This is because that the present invention is applicable to the adjustment of the change of optical transmissivities of any pixels with respect to the pixels of the liquid crystal display panel PNL.

Further, the above-mentioned embodiments can be respectively used either in a single form or in combination. This is because that the advantageous effects of the respective embodiments can be obtained in a single form or synergistically.

As has been clearly understood from the foregoing explanation, according to the liquid crystal display device of the present invention, it is possible to properly adjust the change of the characteristics and chromaticity in spite of the simple constitution.

What is claimed is:

1. A liquid crystal display device including a liquid crystal display panel, a back light, and a controller wherein the liquid crystal display panel includes
    a test pixel for detection which has the same constitution as respective pixels constituting a liquid crystal display part of the liquid crystal display panel,
    the test pixel being formed on a region other than the liquid crystal display part, and
    a mirror arranged on an observation-side surface of the liquid crystal display panel, the mirror reflecting light from the backlight through the test pixel, and
    wherein the controller adjusts the intensity of the light from the backlight in response to a signal from a light detector.

2. A liquid crystal display device according to claim 1, wherein
    a frame having a display window which exposes the liquid crystal display part of the liquid crystal display panel is arranged on the observation-side surface of the liquid crystal display panel, and
    the use test pixel is covered with the frame.

3. A liquid crystal display device according to claim 1, wherein
    a polarizing element is formed between the test pixel and the light detector.

4. A liquid crystal display device according to claim 1, wherein
    the light detector is arranged on a surface of the liquid crystal display panel opposite to the observation-side surface, and
    the test pixel is formed between the mirror and the light detector.

5. A liquid crystal display device according to claim 1, wherein the test pixel is a dummy pixel which is formed on peripheries of the respective pixels which constitute the liquid crystal display part.

6. A liquid crystal display device including a liquid crystal display panel for color display, a back light which has a red light source, a green light source, a blue light source, and a controller, wherein
   the liquid crystal display panel includes
   test pixels comprising test red pixel for detection, a test green pixel for detection and a test blue pixel for detection which have the same constitution as respective pixels constituting a liquid crystal display part of the liquid crystal display panel are formed on a region other than the liquid crystal display part,
   a mirror arranged on an observation-side surface of the liquid crystal display panel, the mirror reflecting light from the backlight through the test red pixel, the test green pixel, and the test blue pixel, and
   a light detector which detects light from the mirror,
   wherein the controller adjusts the intensities of the red light source, the green light source and the blue light source of the backlight in response to signals from the light detectors.

7. A liquid crystal display device according to claim 6, wherein
   a frame having a display window which exposes the liquid crystal display part of the liquid crystal display panel is arranged on the observation-side surface of the liquid crystal display panel, and
   the test pixels are covered with the frame.

8. A liquid crystal display device according to claim 6, wherein
   a polarizing element is formed between the test pixels and the light detector.

9. A liquid crystal display device according to claim 6, wherein
   the light detector is arranged on a surface of the liquid crystal display panel opposite to the observation-side surface, and
   the test red pixel, the test green pixel, and the test blue pixel are formed between the mirror and the light detector.

10. A liquid crystal display device according to claim 6, wherein the test red pixel, the test green pixel, and the test blue pixel are dummy pixels which are formed on peripheries of the respective pixels which constitute the liquid crystal display part.

* * * * *